United States Patent
Granot et al.

(10) Patent No.: US 12,551,278 B2
(45) Date of Patent: Feb. 17, 2026

(54) TEMPERATURE MEASUREMENT FOR OPTICAL FIBER BASED LASER TREATMENTS

(71) Applicant: Lumenis Ltd., Yokneam Illit (IL)

(72) Inventors: Asaf Granot, Lotem (IL); Vitaly Rondel, Hadera (IL)

(73) Assignee: Lumenis Ltd., Yokneam Ilit (IL)

( * ) Notice: Subject to any disclaimer, the term of this patent is extended or adjusted under 35 U.S.C. 154(b) by 361 days.

(21) Appl. No.: 18/143,543

(22) Filed: May 4, 2023

(65) Prior Publication Data
US 2023/0355306 A1    Nov. 9, 2023

Related U.S. Application Data

(60) Provisional application No. 63/338,950, filed on May 6, 2022.

(51) Int. Cl.
*A61B 18/22* (2006.01)
*A61B 18/00* (2006.01)
*A61B 18/20* (2006.01)

(52) U.S. Cl.
CPC .... *A61B 18/22* (2013.01); *A61B 2018/00797* (2013.01); *A61B 2018/20553* (2017.05); *A61B 2018/206* (2013.01); *A61B 2018/207* (2013.01)

(58) Field of Classification Search
None
See application file for complete search history.

(56) References Cited

U.S. PATENT DOCUMENTS

| | | | |
|---|---|---|---|
| 4,215,275 A | 7/1980 | Wickersheim | |
| 5,004,913 A * | 4/1991 | Kleinerman | G01K 11/3213 374/161 |
| 5,225,887 A * | 7/1993 | Lipson | G01D 5/268 356/477 |
| 8,854,608 B2 * | 10/2014 | Onoda | G01D 5/30 356/73.1 |
| 2011/0066035 A1 * | 3/2011 | Norris | A61B 18/20 600/478 |
| 2012/0232534 A1 | 9/2012 | Rink et al. | |
| 2022/0287760 A1 * | 9/2022 | Huber | A61B 18/04 |

FOREIGN PATENT DOCUMENTS

WO    2021144801 A1    7/2021

OTHER PUBLICATIONS

International Search Report and Written Opinion dated Jul. 21, 2023 for International Application No. PCT/US2023/021070.

* cited by examiner

Primary Examiner — Michael T. Holtzclaw
(74) Attorney, Agent, or Firm — Seager, Tufte & Wickhem, LLP (57) ABSTRACT

The present disclosure provides a method and system for estimating the temperature of a working environment. Treatments that use laser and optical fiber technology may cause an undesirable increase in the temperature of a working environment. To that end, a laser source to generate light beams sensitive to a change in temperature can be generated and the temperature determined based on a distance between a distal end of the optical fiber and a target and the generated temperature of the sensitive light beam.

20 Claims, 8 Drawing Sheets

TEMPERATURE MEASUREMENT FOR OPTICAL FIBER BASED LASER TREATMENTS

CROSS-REFERENCE TO RELATED APPLICATIONS

This application claims the benefit of priority under 35 U.S.C. § 119 of U.S. Provisional Application No. 63/338,950, filed May 6, 2022, the entire disclosure of which is hereby incorporated by reference.

BACKGROUND

Introduction of lasers into the medical field and the development of fiber optic technologies that use lasers has opened numerous applications in treatments, diagnostics, therapies, and the like. Such applications range from invasive and non-invasive treatments to endoscopic surgeries and image diagnostics. For instance, in urinary stone treatment, the stones are required to be fragmented into smaller pieces. A technology known as laser lithotripsy may be used for such fragmenting processes, wherein for small to medium sized urinary stones, a rigid or flexible ureteroscope is placed through the urinary tract for illumination and imaging. Simultaneously, an optical fiber is inserted through a working channel of the ureteroscope, to a target location (e.g., to the location where the stone is present in the bladder, ureter, or kidney). The laser is then activated to fragment the stone into smaller pieces or to dust it. In another instance, a laser and optic fiber technology is used in coagulation or ablation treatments. During an ablation treatment, laser light is delivered to the tissue to vaporize the tissue. During a coagulation treatment, laser light is used to induce thermal damage within the tissue. Such ablation treatments may be used for treating various clinical conditions, such as Benign Prostate Hyperplasia (BPH), cancers such as prostate cancer.

BRIEF SUMMARY

This Summary is provided to introduce a selection of concepts in a simplified form that are further described below in the Detailed Description. This Summary is not intended to necessarily identify key features or essential features of the claimed subject matter, nor is it intended as an aid in determining the scope of the claimed subject matter.

In one embodiment, the disclosure provides an apparatus including a light source, the light source arranged to generate a source light beam wherein a coefficient of absorption of the source light beam in a liquid medium is a function of the temperature of the liquid medium; a first detector arranged to measure an intensity of the source light beam; an optical component arranged to convey the source light beam to an optical fiber and to receive a reflected light beam responsive to the source light beam being directed at the target via the optical fiber; a second detector arranged to measure an intensity of the reflected light beam; and processing circuitry arranged to determine a temperature of a working environment based on the measured intensity of the source light beam, the measured intensity of the reflected light beam, and a distance between a distal end of the optical fiber and the target.

In a further embodiment, the apparatus includes a beam splitter arranged to receive the light beam and direct a first portion of the light beam to the first detector and a second portion of the light beam to the optical component.

In another further embodiment, the apparatus includes a treatment light source arranged to generate a treatment light beam, wherein the optical component comprises a beam combiner arranged to combine the treatment light beam and the second portion of the light beam.

In another further embodiment, the apparatus includes at least one of a focusing lens, a blast shield, and a port arranged to optically convey the combined treatment light beam and the second portion of the light beam to the optical fiber.

In another further embodiment, the apparatus includes wherein the treatment light source is a holmium gas laser or a thulium fiber laser.

In another further embodiment, the apparatus includes wherein the beam splitter is arranged to direct the reflected light beam to the second detector.

In another further embodiment, the apparatus includes wherein the light source is a first light source and the light beam a first light beam, the apparatus comprising: a second light source, the second light source arranged to generate a second light beam wherein a coefficient of absorption of the second light beam in a liquid medium is a function of the temperature of the liquid medium, and wherein a wavelength of the first light beam and a wavelength of the second light beam are different; and an optical multiplexor arranged to combine the first light beam and the second light beam.

In another further embodiment, the apparatus includes the processing circuitry comprising a processing unit and a memory device storing instructions that when executed by the processing unit cause the processing unit to: determine an absorption coefficient based on the measured intensity of the light beam, the measured intensity of the reflected light beam, and the distance; and determine the temperature based on the absorption coefficient.

In another further embodiment, the apparatus includes wherein the instructions, when executed by the processing unit cause the processing unit to determine the absorption coefficient based on the formula: $I=I_0 e^{2\lambda D}$, where D is the distance, $\lambda$ is the absorption coefficient, $I_0$ is the measured intensity of the light beam, I is the measured intensity of the reflected light beam, and e is Euler's number.

In another further embodiment, the apparatus includes wherein the distal end of the optical fiber and the target are disposed in the working environment.

In one embodiment the disclosure provides a method comprising generating a light beam wherein a coefficient of absorption of the light beam in a liquid medium is a function of the temperature of the liquid medium; measuring an intensity of the light beam; conveying the light beam to an optical fiber; receive a reflected light beam responsive to the light beam being directed at the target via the optical fiber; measuring an intensity of the reflected light beam; and determining a temperature of a working environment based on the measured intensity of the light beam, the measured intensity of the reflected light beam, and a distance between a distal end of the optical fiber and the target.

In a further embodiment, the method includes splitting, at a beam splitter, the light beam into a first portion and a second portion; directing, via the beam splitter, the first portion of the light beam to a reference detector; and directing, via the beam splitter, the second portion of the light beam to an optical component, the optical component arranged to convey the light beam to the optical fiber.

In a further embodiment, the method includes generating a treatment light beam; and combining the treatment light beam and the second portion of the light beam.

In a further embodiment, the method includes wherein the optical component comprises at least one of a focusing lens, a blast shield, and a port.

In a further embodiment, the method includes wherein the treatment light beam is generated via a holmium gas laser or a thulium fiber laser.

In a further embodiment, the method includes directing, via the beam splitter, the reflected light beam to a reflection detector.

In a further embodiment, the method includes the light beam a first light beam, the method comprising: generating a second light beam wherein a coefficient of absorption of the second light beam in a liquid medium is a function of the temperature of the liquid medium, and wherein a wavelength of the first light beam and a wavelength of the second light beam are different; and combining the first light beam and the second light beam.

In a further embodiment, the method includes determining an absorption coefficient based on the measured intensity of the light beam, the measured intensity of the reflected light beam, and the distance; and determining the temperature based on the absorption coefficient.

In a further embodiment, the method includes determining the absorption coefficient based on the formula: $I=I_0 e^{2\lambda D}$, where D is the distance, $\lambda$ is the absorption coefficient, $I_0$ is the measured intensity of the light beam, I is the measured intensity of the reflected light beam, and e is Euler's number.

In a further embodiment, the method includes wherein the distal end of the optical fiber and the target are disposed in the working environment.

In one embodiment, the disclosure provides a non-transitory computer-readable storage medium, the computer-readable storage medium including instructions that when executed by a computer, cause the computer to: send a control signal to a light source to cause the light source to generate a light beam wherein a coefficient of absorption of the light beam in a liquid medium is a function of the temperature of the liquid medium; receive an indication of an intensity of the light beam, wherein the light beam is to be conveyed to a target via an optical fiber and wherein a reflected light beam is to be received by the optical fiber; receive an indication of an intensity of the reflected light beam; determine a temperature of a working environment based on the intensity of the light beam, the intensity of the reflected light beam, and a distance between a distal end of the optical fiber and the target.

In a further embodiment, the computer-readable storage medium includes instructions that when executed by the computer, cause the computer to: send a control signal to a treatment light source to cause the treatment light source to generate a treatment light beam, wherein the treatment light beam and the light beam are to be combined and delivered to the target.

In another further embodiment, the computer-readable storage medium includes the light source a first light source and the light beam a first light beam, the medium comprising instructions that when executed by the computer, cause the computer to: send a control signal to a second light source to cause the second light source to generate a second light beam wherein a coefficient of absorption of the second light beam in a liquid medium is a function of the temperature of the liquid medium, and wherein a wavelength of the first light beam and a wavelength of the second light beam are different.

In another further embodiment, the computer-readable storage medium includes instructions that when executed by the computer, cause the computer to: determine an absorption coefficient based on the measured intensity of the light beam, the measured intensity of the reflected light beam, and the distance; and determine the temperature based on the absorption coefficient.

In another further embodiment, the computer-readable storage medium includes instructions that when executed by the computer, cause the computer to determine the absorption coefficient based on the formula: $I=I_0 e^{2\lambda D}$, where D is the distance, $\lambda$ is the absorption coefficient, $I_0$ is the measured intensity of the light beam, I is the measured intensity of the reflected light beam, and e is Euler's number.

BRIEF DESCRIPTION OF THE SEVERAL VIEWS OF THE DRAWINGS

To easily identify the discussion of any element or act, the most significant digit or digits in a reference number refer to the figure number in which that element is first introduced.

DETAILED DESCRIPTION

The present disclosure provides a method and system for estimating the temperature in a working environment and more particularly the temperature between an optical fiber end and a target. It is to be appreciated that treatments using lasers can increase a temperature in the working environment, which can lead to unwanted tissue damage or other safety issues. As a result it is advantageous to determine the temperature of the working environment. However, current laser treatments and system do not provide a method or means to measure the temperature inside many working environments (e.g., a urinary tract, a kidney, or the like).

To that end, a laser system and techniques that enable estimation of the temperature between a fiber end and a target (e.g., tissue, stone, or the like) based on the coefficient of absorption of wavelengths of light in a liquid medium are provided. The present disclosure may be used for the purpose of controlling and/or adjusting one or more operational parameters. For instance, during a treatment, the laser power can be modulated to control or keep temperature of the working environment below a desired limit.

The foregoing has broadly outlined the features and technical advantages of the present disclosure such that the following detailed description of the disclosure may be better understood. It is to be appreciated by those skilled in the art that the embodiments disclosed may be readily utilized as a basis for modifying or designing other structures for carrying out the same purposes of the present disclosure. The novel features of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1A:
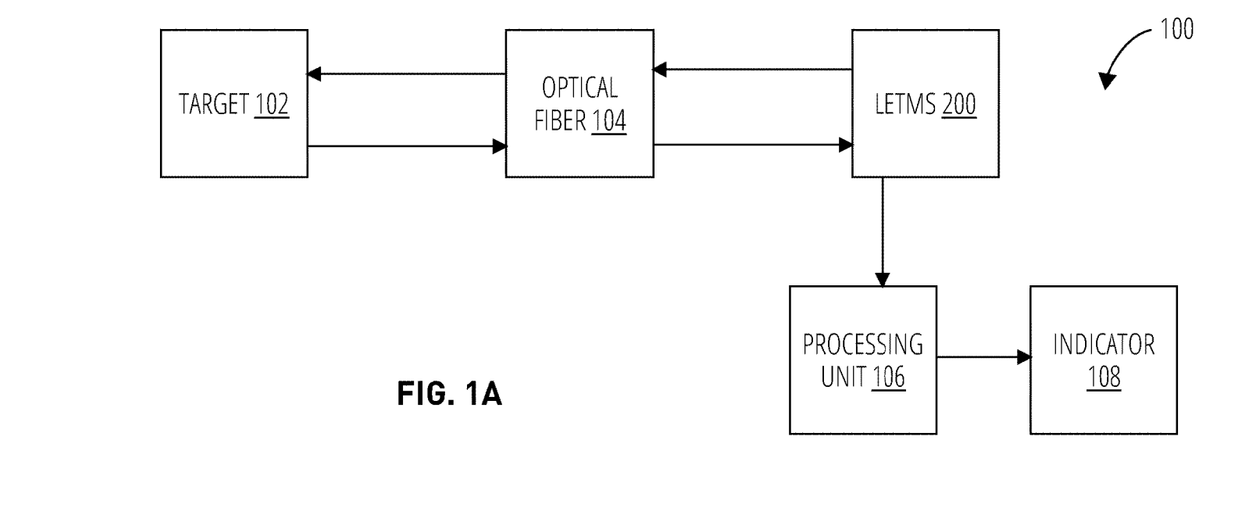
FIG. 1A illustrates a system 100 in accordance with at least one embodiment of the disclosure.
Figure 1B:
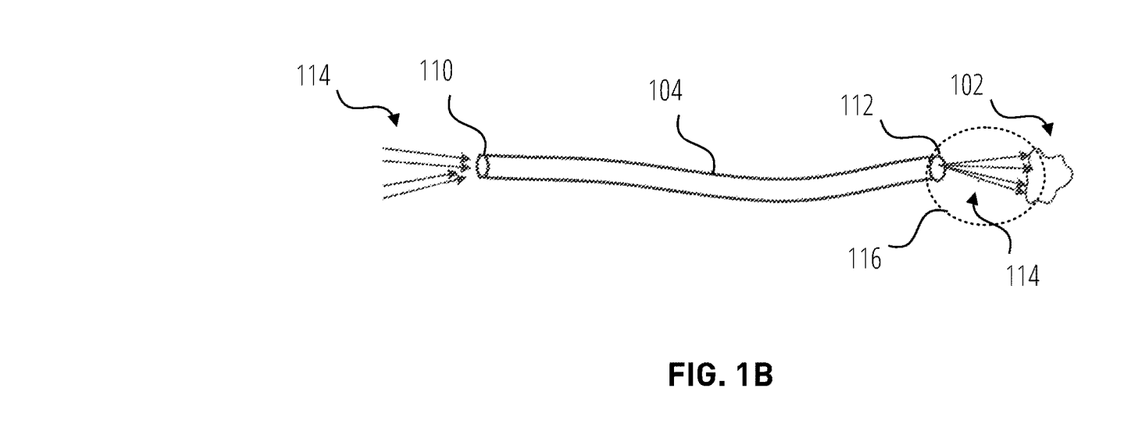
FIG. 1B illustrates a portion of the system 100 of FIG. 1A in greater detail in accordance with at least one embodiment of the disclosure.

FIG. 1A and FIG. 1B show an exemplary system 100 for estimating a temperature between a fiber end and a target in accordance with some embodiments of the present disclosure. In some embodiments, the exemplary system 100 comprises a target 102, an optical fiber 104, a light emitting temperature measurement system (LETMS) 200, a processing unit 106, and an indicator 108. In some embodiments, the target 102 may be a tissue, a stone, a tumor, a cyst, and the like, within a subject, which is to be treated, ablated, or destroyed. In some embodiments, the subject may be a human being or an animal.

Further, as depicted more fully in FIG. 1B, the optical fiber 104 comprises a proximal end 110 and a distal end 112. The proximal end 110 is the end of the optical fiber 104 through which light beams enter while the distal end 112 is the end of the optical fiber 104 through which light beams are emitted and via which light beams can be directed onto the target 102. For example, this figure depicts incident light 114 entering the optical fiber 104 at the proximal end 110, propagating through length of the optical fiber 104, exiting the optical fiber 104 at the distal end 112, and being incident on the target 102 from the distal end 112 of the optical fiber 104.

In some embodiments, the light beams may be beams directed from a light source. For example, the light source can be a laser light source. As an example, the laser light sources may include, but is not limited to, solid-state lasers, gas lasers, diode lasers, and fiber lasers. The light beams may include one or more of an aiming beam, a treatment beam, and any other beam transmitted through the optical fiber 104. In various embodiments, an aiming beam may include a light beam of low intensity that is transmitted through the optical fiber 104 to estimate the temperature of the environment (e.g., liquid medium, or the like) between the optical fiber end (e.g., the distal end 112) and the target 102.

In several embodiments, a treatment beam may include a light beam of high intensity that is transmitted through the optical fiber 104 to treat the target 102. In some embodiments, the different light beams may be produced by one or more laser light sources. As a specific example, the aiming beam may be generated by one laser source and the treatment beam may be generated by another laser source. In another example, both the aiming beam and the treatment beam may be generated by a single laser source. With yet another example, different laser light sources may be used to generate light beams of different wavelengths, characteristics, and the like. This is described in greater detail below.

The optical fiber 104 may be in optical communication with the light emitting temperature measurement system (LETMS) 200 as shown in the FIG. 1A and arranged to receive light beams, to be aimed at the target 102, and to deliver reflected light beams that reflect from the surface of and region around the target 102. In some embodiments, the optical fiber 104 may be optically, mechanically, and/or electrically coupled with the light emitting temperature measurement system (LETMS) 200 via a port (shown in other figures herein).

In some embodiments, the light emitting temperature measurement system (LETMS) 200 comprises optical components which may include, but are not limited to, one or more of laser light sources, wavelength division multiplexers, collimators, polarizers, beam splitters, detectors, beam combiners, focusing lenses, etc., as explained in detail in further parts of the present disclosure. In many embodiments, laser light sources are configured to generate laser light beams, such as a low intensity aiming beam for the purpose of aiming the incident light 114 at the target 102 and a high intensity treatment beam for treating the target 102, and/or light beams with varying characteristics (e.g., intensities, wavelengths, etcetera) based on the application.

In general, during operation, some portion of the incident light 114 will be reflected from the target 102 and/or region around the target 102 and be transmitted from the distal end 112 of the optical fiber 104 to the proximal end 110 of the optical fiber 104 and back into the LETMS 200. The present disclosure provides to determine a temperature of the working environment 116 based on this reflected light. For example, the light emitting temperature measurement system (LETMS) 200 is associated with a processing unit 106 and/or a communication network (not shown). In some embodiments, the communication network may be a wired communication network or a wireless communication network. The processing unit 106 may be configured to receive measured values from the light emitting temperature measurement system (LETMS) 200 related to the incident light 114 and reflected light (not shown) and estimate the temperature of the working environment 116 based on the measured values. In some embodiments, the processing unit 106 may be a standalone device with the processing capability required for temperature estimation. For example, processing unit 106 can include circuitry arranged to determine a distance based on electrical signals received from the light emitting temperature measurement system (LETMS) 200. As another example, processing unit 106 can include circuitry and memory comprising instructions, which when executed by the circuitry cause the circuitry to determine a temperature based on electrical signals received from the light emitting temperature measurement system (LETMS) 200. Still, in some other embodiments, the processing unit 106 may be a computing device such as a laptop, a desktop, a mobile phone, a tablet phone, and the like, configured to perform the distance estimation using their processing capability.

The processing unit 106 may be associated with the indicator 108 to indicate the estimated temperature of the working environment 116. The indicator 108 may include, but is not limited to, a visual indicator which displays the estimated distance, an audio indicator which announces the estimated temperature, or a haptic indicator which indicates the estimated temperature via vibration patterns. In various embodiments, the indicator may be presented via a graphical user interface and/or overlaid on a graphical representation, such as a video feed. In some embodiments, a computing device comprising the processing unit 106 may be configured to perform the functionalities of the indicator 108. In some other embodiments, the indicator 108 may be a standalone device which is configured to indicate the estimated temperature of the working environment 116.

With some further embodiments, the processing unit 106 can be coupled to the LETMS 200 such that the processing unit 106 can control or adjust the treatment beam (described in greater detail below) based on the estimated temperature. As a specific example, the processing unit 106 can reduce the power of the treatment beam or pause the treatment beam based on a determination that the estimated temperature is above a threshold level.

Figure 2:
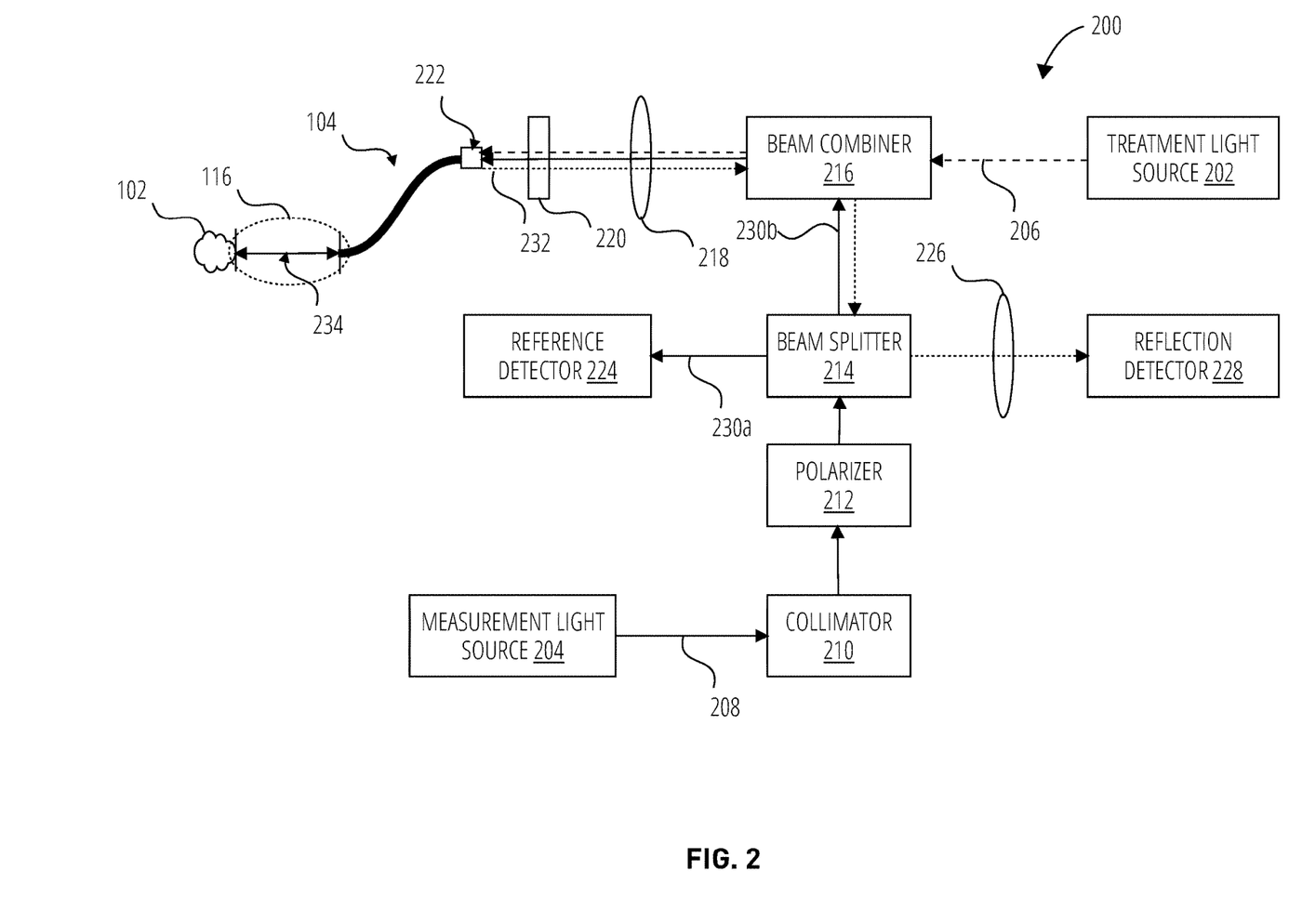
FIG. 2 illustrates a light emitting temperature measurement system (LETMS) 200 in accordance with at least one embodiment of the disclosure.

FIG. 2 illustrates the LETMS 200, according to some embodiments of the present disclosure. As shown, the LETMS 200 includes a treatment light source 202 and a measurement light source 204. In general, the LETMS 200 includes at least one measurement laser source (e.g., just measurement light source 204, or the like). However, as will be described more fully herein, an LETMS like the LETMS 200 can include multiple ones of the measurement light source 204 (e.g., see FIG. 5). The treatment light source 202 can be any of a variety of laser sources (e.g., fiber laser, a gas laser, diode laser, solid-state laser, or the like) arranged to output treatment beam 206. Likewise, the measurement light sources 204 can be any of a variety of laser sources (e.g., fiber laser, gas laser, diode laser, solid-state laser, or the like) arranged to output a "low power" (e.g., lower power than the treatment beam 206) measurement beam 208, which is used to determine the temperature of the working environment 116.

The LETMS 200 further includes a collimator 210, a polarizer 212, a beam splitter 214, a beam combiner 216, a focusing lens 218, a blast shield 220, a port 222, a reference detector 224, a focusing lens 226, and a reflection detector 228. The collimator 210 may be optically coupled to the measurement light source 204 and arranged to narrow the measurement beam 208. For example, collimator 210 may be configured to cause the directions of motion of measurement beam 208 to become more aligned in a specific direction (for example, parallel rays), or to cause the spatial cross section of the beam to become smaller. In many embodiments, collimator 210 may be used to change diverging light from a point source into a parallel beam.

The polarizer 212 may be optically coupled to the collimator 210 and arranged to allow light beams of a specific polarization to pass, and to block the light beams of a different polarization. Therefore, when undefined light (or light beams of mixed polarity) are provided as input to a polarizer, the polarizer provides a well-defined single polarized light beam as an output.

The beam splitter 214 may be optically coupled to the polarizer 212 and arranged to split incident light (e.g., measurement beam 208) at a designated ratio into two separate beams (e.g., light beam portions 230a and 230b). Further, beam splitters may be arranged to manipulate light to be incident at a desired angle of incidence (AOI). Therefore, in many embodiments, a beam splitter can be primarily configured with two parameters, a ratio of separation and an AOI. As depicted in this figure, beam splitter 214 is arranged to direct a portion of measurement beam 208 to the reference detector 224 and another portion of measurement beam 208 to the beam combiner 216.

The beam combiner 216 may be optically coupled to the beam splitter 214 and the treatment light source 202 and arranged to combine the treatment beam 206 and the measurement beam 208. For example, beam combiner 216 can include partial reflectors that combine two or more wavelengths of light, such as by using the principle of transmission and reflection. In many embodiments, a beam combiner may be a combination of beam splitters and mirrors, which perform the functionality of combining light of two or more wavelengths.

The focusing lens 218 and the blast shield 220 may be optically coupled to the beam combiner 216 and arranged to focus treatment beam 206 and measurement beam 208 and direct the treatment beam 206 and measurement beam 208 through the blast shield 220 to the port 222 such that the treatment beam 206 and the measurement beam 208 can be transmitted through the measurement light source 204 to the target 102. In particular, the light beam portion 230b and the treatment beam 206 are directed to target 102 via optical fiber 104 and the light is incident on target 102, which is a known distance 234 away from the distal end 112 of the optical fiber 104. With some examples, the distance 234 can be measured in real time while the temperature is also measured in real time (e.g., see FIG. 6).

As described above, a portion of the measurement beam 208 is reflected back into optical fiber 104 and transmitted through the LETMS 200 as reflected beam 232. In particular, the reflected beam 232 is directed by beam combiner 216 to beam splitter 214 and directed to reflection detector 228 by beam splitter 214. Further, in some embodiments, reflection detector 228 is disposed in an optical path between beam splitter 214 and reflection detector 228 and arranged to focus or amplify reflected beam 232.

The reference detector 224 and reflection detector 228 may include devices that detect and/or measure characteristics of light beams and encode the detected and/or measured characteristics in electrical signals. For example, light detectors may detect the specific type of light beams (as preconfigured), and convert the light energy associated with the detected light beams into electrical signals.

It is noted that the LETMS 200 depicted in this figure is given for example only and some components can be omitted (or substituted for other components) in alternative embodiments. For example, where the measurement light source 204 is not fiber based the collimator 210 can be omitted. As another example, the polarizer 212 can be omitted for measurement light sources 204 that are arranged to output measurement beam 208 of sufficient power and/or stability for measurement without separating the polarization. As another example, the focusing lens 218 and/or focusing lens 226 as well as the blast shield 220 can be omitted depending upon other design considerations.

In general, the reference detector 224 and the reflection detector 228 can be electrically and/or communicatively coupled to the processing unit 106 such that the processing unit 106 can receive signals from the reference detector 224 and 228 comprising indications of the measurement beam 208 and reflected beam 232. Processing unit 106 can be arranged to determine the temperature of working environment 116 based on these signals, as will be described in greater detail below.

In general, the present disclosure provides to determine the temperature based on the measured characteristics and a wavelength of light associated with the measurement beam 208 as well as a known distance 234 between the distal end 112 of the optical fiber 104 and the target 102. It is noted that the distance 234 can itself be measured. The measurement relies on the fact that for certain wavelengths of light, the coefficient of absorption of the light in a liquid medium changes with a change in the temperature of the liquid medium. It is to be appreciated that the coefficient of absorption for different temperatures does not change dramatically for many wavelengths. However, there are some isobars in physics that create this exact phenomena. The present disclosure provides that the measurement beam 208 is generated with a wavelength whose coefficient of absorption in a liquid medium doses change with the temperature of the liquid medium.

Figure 3A:
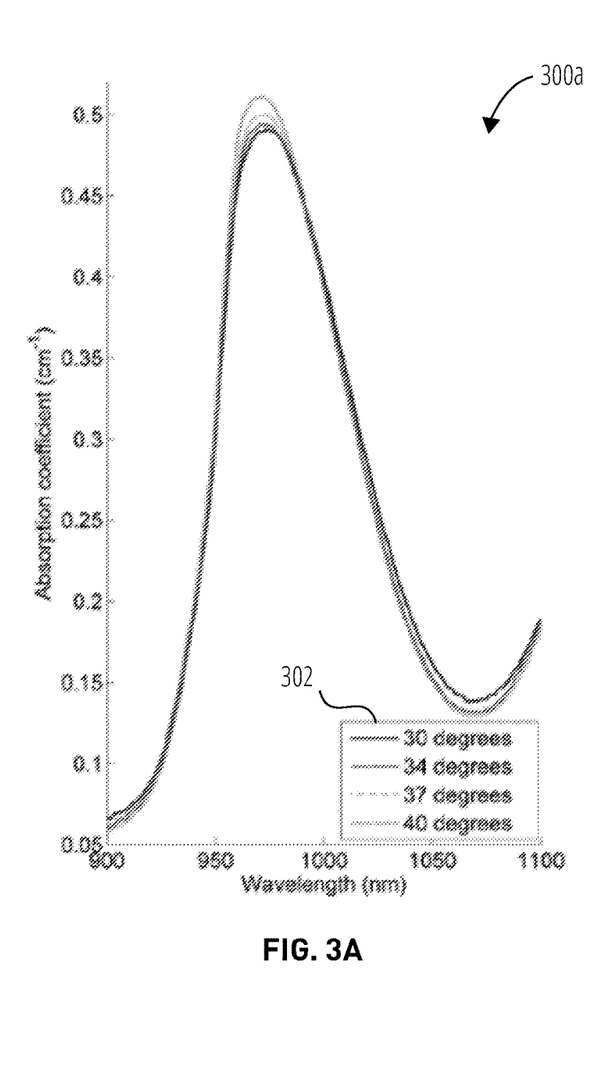
FIG. 3A illustrates a plot 300a describing temperature sensitive light beams.
Figure 3B:
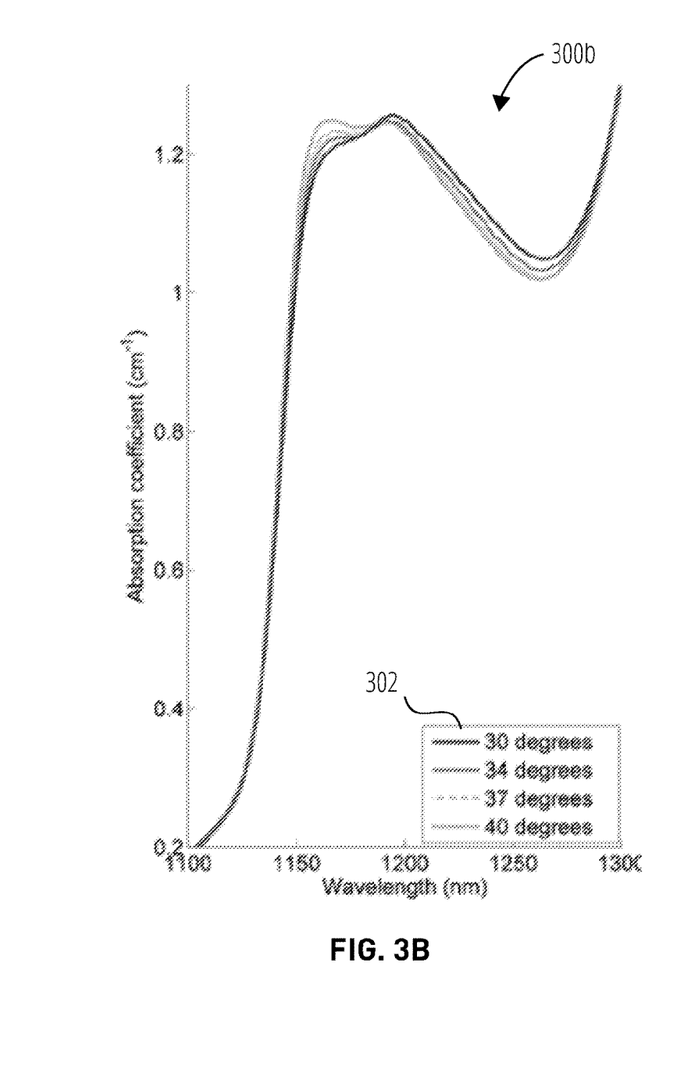
FIG. 3B illustrates a plot 300b describing temperature sensitive light beams.

For example, FIG. 3A and FIG. 3B illustrate plot 300a and plot 300b, respectively, which depict a number of curves 302 associated with various temperatures. Each of curves 302 are plotted as wavelength in nanometers (nm) of the x axis and the absorption coefficient in centimeters (cm)$^{-1}$ on they axis. As can be seen, for some wavelengths of light (e.g., 975 nm, 1075 nm, 1160 nm, 1250 to 1260 nm, etc.) the coefficient of absorption of the light in a liquid medium changes with a change in the temperature of the liquid medium.

It is to be appreciated that the wavelengths depicted in the curves 302 of plot 300a and 300b are given for example only and that there are a number of other wavelengths of light where the coefficient of absorption changes with a change of temperature, such as, for example, wavelengths in the ultraviolet (UV) spectrum, wavelengths in the visible spectrum, wavelengths in the infrared (IR) spectrum, or the like.

In general, the measurement light source 204 is arranged to generate light having a wavelength where the absorption coefficient changes with a change in temperature.

Figure 4:
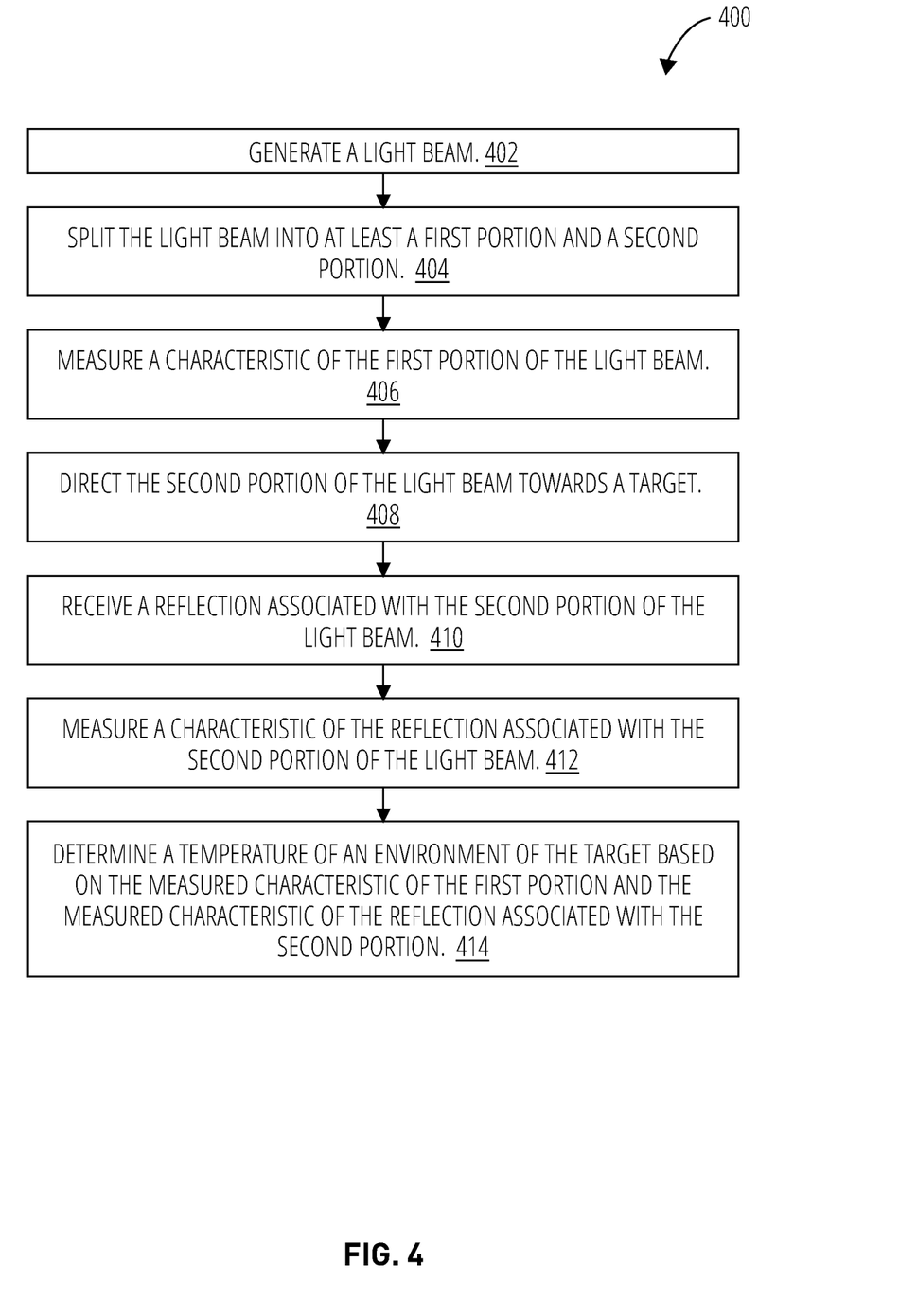
FIG. 4 illustrates a logic flow 400 in accordance with at least one embodiment of the disclosure.

FIG. 4 illustrates a logic flow 400, according to some embodiments of the present disclosure. With some embodiments, the LETMS 200 and the system 100 can be arranged to implement the logic flow 400 to determine a temperature of an environment at outlined herein. However, although the logic flow 400 is described with reference to the system 100 and the LETMS 200, the logic flow 400 could be implemented by a system different than the system 100 of FIG. 1A, FIG. 1B, and FIG. 2.

The logic flow 400 can begin at block 402. At block 402 "generate a light beam" a light beam can be generated. For example, measurement beam 208 can be generated. In some embodiments, processing unit 106 can send a control signal to measurement light source 204 to cause the light sources to generate respective light beams such that measurement beam 208 can be formed. Continuing to block 404 "split the light beam into at least a first portion and a second portion" the generated light beam is split, such as, for example, by a beam splitter. For example, the beam splitter 214 can operate to split measurement beam 208 into light beam portions 230a and 230b.

Continuing to block 406 "measure a characteristic of the first portion of the light beam" a characteristic of the first portion of the light beam generated at block 402 can be measured. For example, reference detector 224 can be arranged to measure an intensity (or other characteristic) of the light beam portion 230a. Continuing to block 408 "direct the second portion of the light beam towards a target" the second portion of the light beam generated at block 402 can be directed towards and/or onto a target. For example, the LETMS 200 can direct the light beam portion 230b to target 102 via optical fiber 104 as described above.

Continuing to block 410 "receive a reflection associated with the second portion of the light beam" a reflection associated with the second portion of the light beam generated at block 402 can be received. For example, the LETMS 200 can receive reflected beam 232 responsive to light beam portion 230b being incident on target 102. In particular, reflected beam 232 can be received via the distal end 112 of the optical fiber 104. Continuing to block 412 "measure a characteristic of the reflection associated with the second portion of the light beam" a characteristic of the reflections associated with the second portion of the light beam generated at block 402 can be measured. For example, reflection detector 228 can be arranged to measure an intensity (or other characteristic) of the reflected beam 232.

Continuing to block 414 "determine a temperature of an environment of the target based on the measured characteristic of the first portion and the measured characteristic of the reflection associated with the second portion" a temperature of the environment of the target (e.g., adjacent to, associated with, etc.) can be determined based on the characteristics measured at block 406 and block 412. In particular, processing unit 106 can determined a temperature of working environment 116 based on the characteristics of the light beam portion 230a and light beam portion 230b as indicated in signals received from reference detector 224 and reflection detector 228.

With some examples, processing unit 106 can determine the temperature based on the measured characteristics and a wavelength of light associated with the measurement beam 208. In particular, with some wavelengths of light, the coefficient of absorption of the light in a liquid medium changes with a change in the temperature of the liquid medium. Processing unit 106 can determine the temperature based on the following formula: $I=I_0 e^{2\lambda D}$, where D is the distance between the distal end 112 of the optical fiber 104 and the target 102 (e.g., the distance 234), $\lambda$ is the absorption coefficient, $I_0$ is the measured intensity of the light beam portions 230a (e.g., the output of reference detector 224), and I is the measured intensity of the reflected beam 232 (e.g., the output of reflection detector 228). The processing unit 106 can be arranged to solve the above equation for $\lambda$ and then determined a temperature of the working environment 116 based on the derived $\lambda$. In some examples, processing unit 106 can include a memory storing a look up table comprising indications of $\lambda$ and an associated temperature. Processing unit 106 can be arranged to determine the temperature from the derived $\lambda$ and the lookup table. In another example, processing unit 106 can be arranged to derive the temperature based on $\lambda$ and another function or formula. As another example, a model (e.g., machine learning model, or the like) can be trained to output temperature given $\lambda$ or even D, I, and $I_0$. In such an example, the processing unit 106 can be arranged to execute the model with inputs (e.g., D, I, and $I_0$) and receive output (e.g., temperature) from the model.

Further, with some embodiments, the LETMS 200 can be configured with a safety feature to reduce an output power of the treatment light source 202 based on the temperature. For example, processing unit 106 can derive the temperature as outlined above and can determine whether the temperature is greater than a threshold value. Based on a determination that the temperature is greater than (or equal to) the threshold value, the processing unit 106 can send a control signal to the treatment light source 202 to cause the treatment light source 202 to either reduce power, pause, or terminate generation of the treatment beam 206.

In some embodiments, the treatment beam 206 can be provided in conjunction with irrigation fluid, such as cooled irrigation fluid. In such example, with some embodiments, the LETMS 200 can be arranged to periodically pause (e.g., for 100 milliseconds to 1 second, or the like) the irrigation fluid flow and measure the temperature while the irrigation fluid flow is paused.

Figure 5:
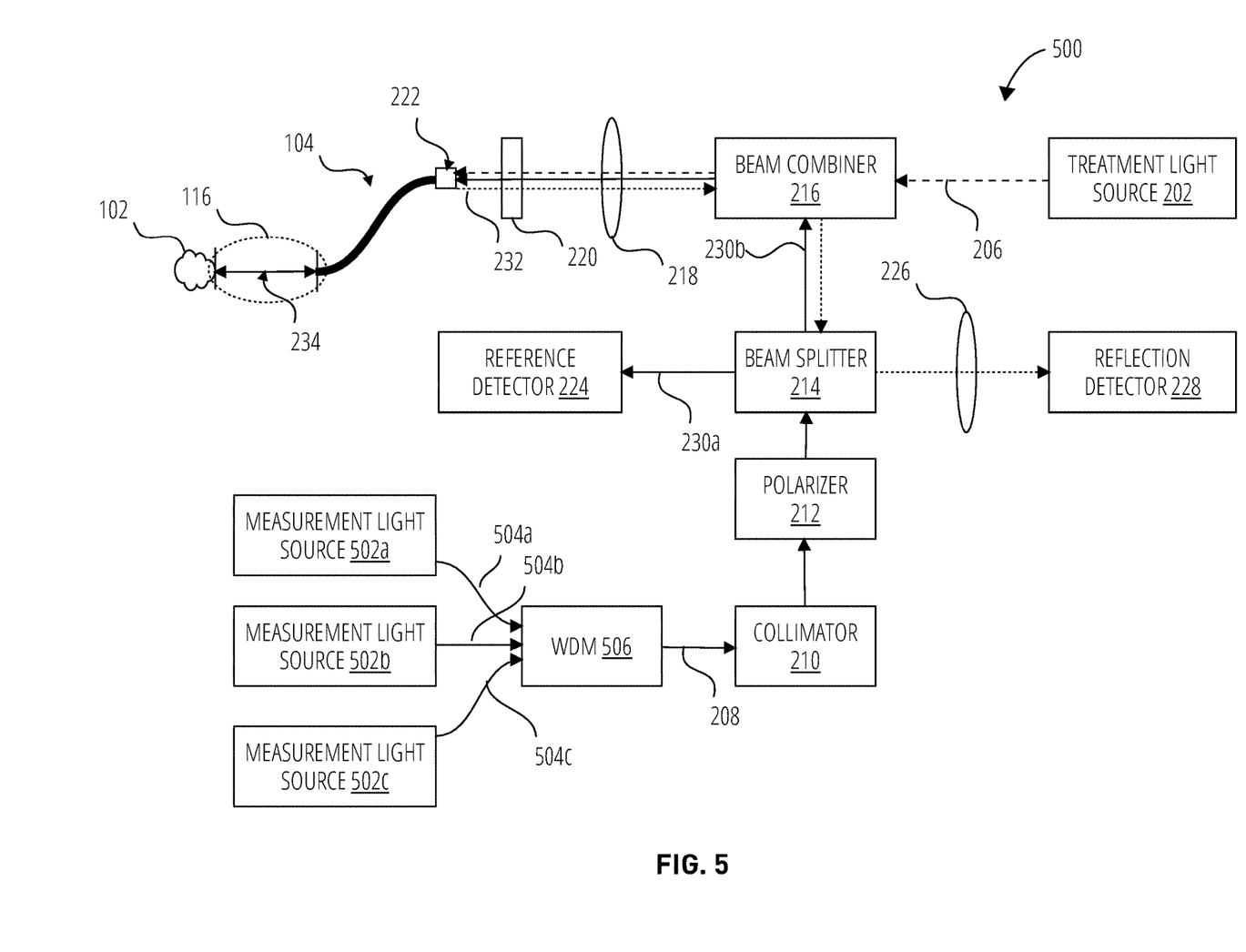
FIG. 5 illustrates a light emitting temperature measurement system (LETMS) 500 in accordance with at least one embodiment of the disclosure.

FIG. 5 illustrates a light emitting temperature measurement system (LETMS) 500, according to some embodiments of the present disclosure. The LETMS 500 includes many of the same components as the LETMS 200 of FIG. 2, with the main difference being that the LETMS 500 includes multiple measurement light sources. As shown, LETMS 500 includes measurement light sources 502a, 502b, and 502c. The measurement light sources 502a, 502b, and 502c can be any of a variety of laser sources (e.g., fiber laser, gas laser, diode laser, solid-state laser, or the like) arranged to output "low power" (e.g., lower power than the treatment beam) measurement beams 504a, 504b, and 504c, which are used to determine the temperature of the working environment 116.

The LETMS 500 further includes a wavelength division multiplexer 506, the collimator 210, the polarizer 212, the beam splitter 214, the beam combiner 216, the focusing lens 218, the blast shield 220, the port 222, the reference detector 224, the focusing lens 226, and the reflection detector 228. Each of the measurement light sources 502a, 502b, and 502c may be configured to generate respective measurement beams 504a, 504b, and 504c having different wavelengths, where each of the different wavelengths can have different water absorption coefficients. Furthermore, the wavelength division multiplexer 506 can be optically coupled to the measurement light sources 502a, 502b, and 502c and arranged to multiplex the measurement beams 504a, 504b, and 504c to form measurement beam 208.

It is noted that the LETMS 500 depicted in this figure is given for example only and some components can be omitted (or substituted for other components) in alternative embodiments. For example, where the measurement light sources 502a, 502b, and/or 502c are not fiber based or where the wavelength division multiplexer 506 is not fiber based, the collimator 210 can be omitted.

Additionally, as multiple measurement light sources 502a, 502b, and 502c are provided, the temperate associated with each respective measurement beams 504a, 504b, and 504c can be determined and then an average temperature derived, for example, to increase an accuracy of the overall temperature measurement system.

Figure 6:
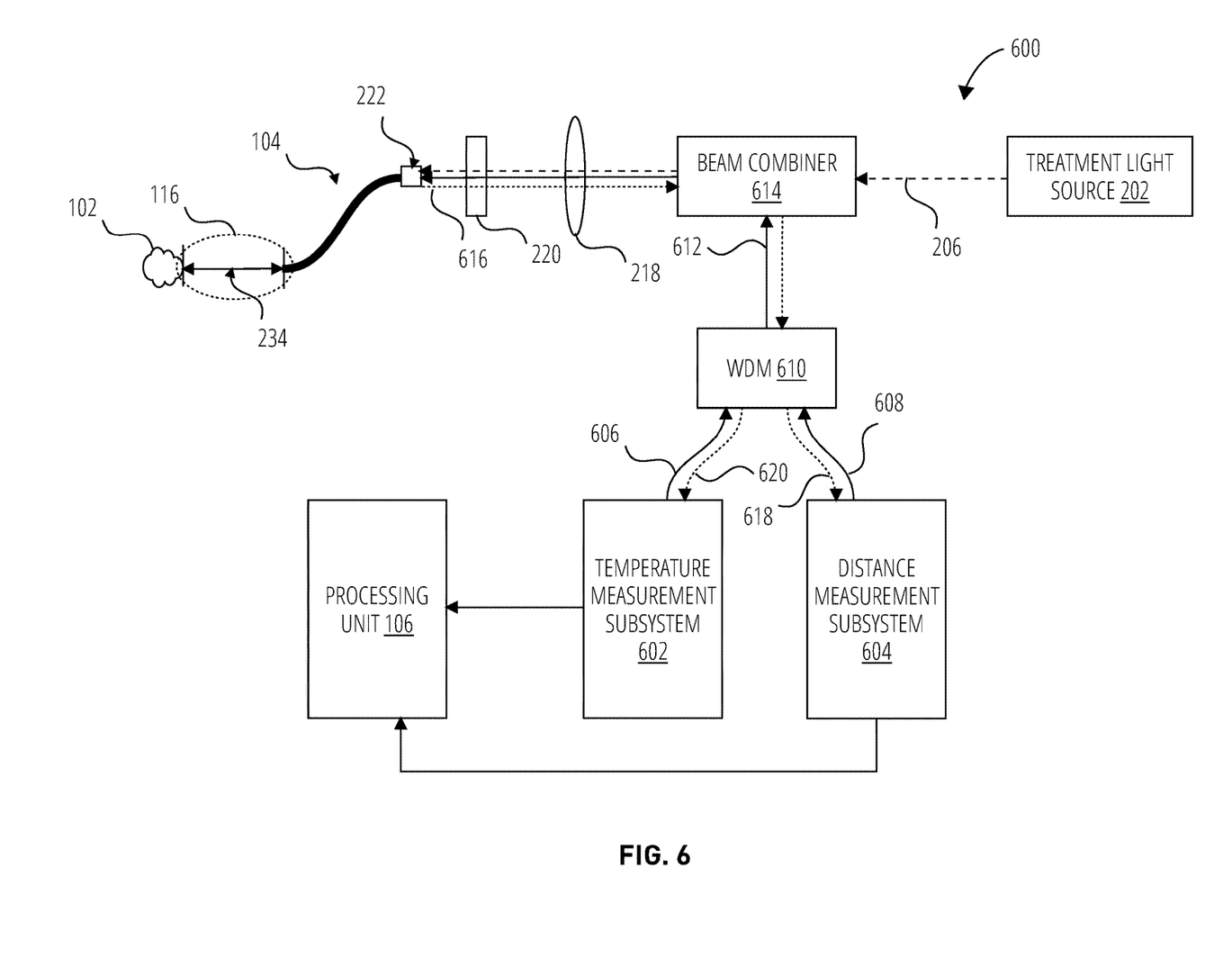
FIG. 6 illustrates a light emitting temperature and distance measurement system (LETDMS) 600 in accordance with at least one embodiment of the disclosure.

FIG. 6 illustrates a light emitting temperature and distance measurement system (LETDMS) 600, according to some embodiments of the present disclosure. As shown, the LETDMS 600 includes the treatment light source 202 and a temperature measurement subsystem 602 and distance measurement subsystem 604. In general, the temperature measurement subsystem 602 can be like the LETMS 200 and/or LETMS 500, which is arranged to generate light beams of a wavelength where the coefficient of absorption changes with a change in temperature. Said differently, the temperature measurement subsystem 602 can be arranged to generate temperature sensitive wavelength light beam 606. Likewise, the distance measurement subsystem 604 can be arranged to generate light beams of a wavelength where the coefficient of absorption does not substantially change with a change in temperature. Said differently, the distance measurement subsystem 604 can be arranged to generate temperature insensitive wavelength light beam 608.

The LETDMS 600 further includes a wave length division multiplexer 610 in optical communication with the temperature measurement subsystem 602 and distance measurement subsystem 604 and arranged to generate combined light beam 612 comprising both the temperature sensitive wavelength light beam 606 and temperature insensitive wavelength light beam 608. A beam combiner 614 (e.g., like the beam combiner 216) can be optically coupled to the wave length division multiplexer 610 and the treatment light source 202 and arranged to combine the treatment beam 206 and the combined light beam 612, which can be delivered to the target 102 via the optical fiber 104 as described above.

As described above, a portion of the combined light beam 612 is reflected back into optical fiber 104 and transmitted through the LETMS 200 as reflected beam 616. In particular, the reflected beam 616 is directed by beam combiner 614 to wavelength division multiplexer 610 where the reflected beam 616 is split into temperature insensitive wavelength reflected light beam 618 and temperature sensitive wavelength reflected light beam 620 and directed to the temperature measurement subsystem 602 and distance measurement subsystem 604, respectively.

It is noted that measuring the distance 234 is beyond the scope of this disclosure. As such, specific components and arrangements of distance measurement subsystem 604 are not described herein. However, in general, the distance measurement subsystem 604 can comprise a laser source or sources arranged to generate temperature insensitive wavelength light beam 608 optical detectors arranged to measure an intensity of an optical signal and other optical components (e.g., beam splitters, polarizers, combiners, lenses, mirrors, etc.) arranged such that the distance 234 can be determined from the temperature insensitive wavelength light beam 608 and temperature insensitive wavelength reflected light beam 618.

The temperature measurement subsystem 602 can comprise components similar to the components of the LETMS 200 or LETMS 500 described above. As such, the temperature measurement subsystem 602 can be arranged to generate temperature sensitive wavelength light beam 606 and receive temperature sensitive wavelength reflected light beam 620 and determine a temperature of the working environment 116 based on the temperature sensitive wavelength light beam 606 and temperature sensitive wavelength reflected light beam 620 as well as the distance 234.

The LETDMS 600 can further include processing circuitry, such as, processing unit 106. The processing unit 106 can be coupled to the temperature measurement subsystem 602 and distance measurement subsystem 604 and arranged to receive signals comprising indications of an intensity of the temperature sensitive wavelength light beam 606, temperature insensitive wavelength light beam 608, temperature insensitive wavelength reflected light beam 618, and temperature sensitive wavelength reflected light beam 620 and determine the distance 234 and temperature of working environment 116 based on these signals.

Figure 7:
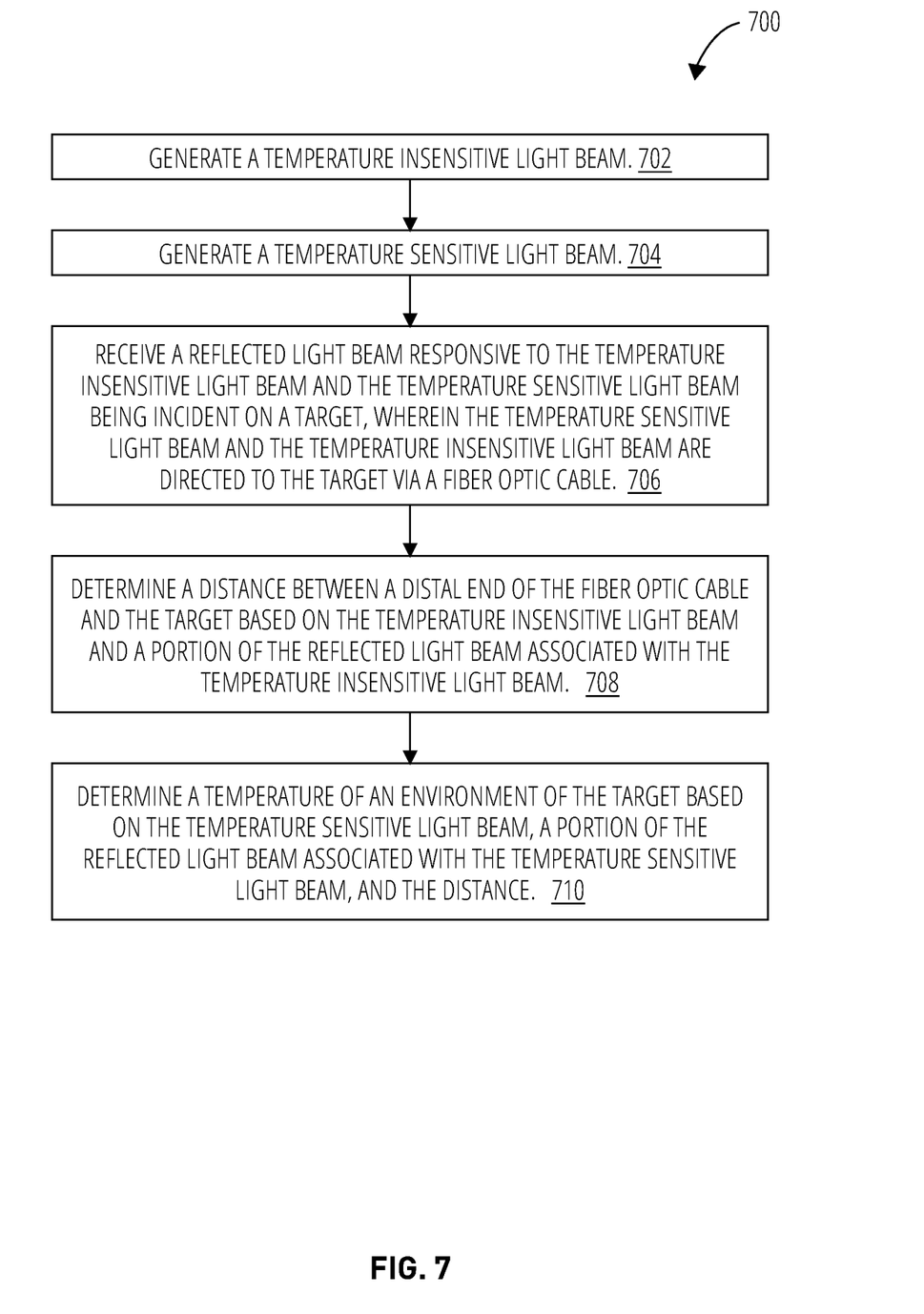
FIG. 7 illustrates a logic flow 700 in accordance with at least one embodiment of the disclosure.

FIG. 7 illustrates a logic flow 700, according to some embodiments of the present disclosure. With some embodiments, the LETDMS 600 can be arranged to implement the logic flow 700 to determine a temperature of an environment at outlined herein. However, although the logic flow 700 is described with reference to the LETDMS 600, the logic flow 700 could be implemented by a system different than the LETDMS 600.

The logic flow 700 can begin at block 702. At block 702 "generate a temperature insensitive light beam" a temperature insensitive light beam can be generated. For example, distance measurement subsystem 604 can generate temperature insensitive wavelength light beam 608. Said differently, the distance measurement subsystem 604 can generate a light beam (e.g., temperature insensitive wavelength light beam 608) where the coefficient of absorption does not depend on the temperature of the liquid medium. In some embodiments, processing unit 106 can send a control signal to distance measurement subsystem 604 to cause distance measurement subsystem 604 to generate temperature insensitive wavelength light beam 608.

Continuing to block 704 "generate a temperature sensitive light beam" a temperature sensitive light beam can be generated. For example, temperature measurement subsystem 602 can generate temperature sensitive wavelength light beam 606. Said differently, the temperature measurement subsystem 602 can generate a light beam (e.g., temperature sensitive wavelength light beam 606) where the coefficient of absorption depends on (or changes with) the temperature of the liquid medium. In some embodiments, processing unit 106 can send a control signal to temperature measurement subsystem 602 to cause temperature measurement subsystem 602 to generate temperature sensitive wavelength light beam 606.

Continuing to block 706 "receive a reflected light beam responsive to the temperature insensitive light beam and the temperature sensitive light beam being incident on a target, wherein the temperature sensitive light beam and the temperature insensitive light beam are directed to the target via a fiber optic cable" a reflected light beam responsive to the temperature insensitive light beam and the temperature sensitive light beam being incident on a target of received. For example, the combined light beam 612 can be generated from the temperature sensitive wavelength light beam 606 and temperature insensitive wavelength light beam 608 and delivered to the target 102 via the optical fiber 104. Responsive to the combined light beam 612 being delivered to the target 102 via the optical fiber 104, the reflected beam 616 can be received.

Continuing to block 708 "determine a distance between a distal end of the fiber optic cable and the target based on the temperature insensitive light beam and a portion of the reflected light beam associated with the temperature insensitive light beam" a distance between the distal end of the fiber optic cable and the target can be determined. For example, the distance measurement subsystem 604 can receive a portion of the reflected beam 616 associated with the temperature insensitive wavelength light beam 608 (e.g., temperature insensitive wavelength reflected light beam 618) and can determine the distance 234 based on the temperature insensitive wavelength light beam 608 and temperature insensitive wavelength reflected light beam 618. As a specific example, distance measurement subsystem 604 can include optical detectors arranged to measure an intensity of the temperature insensitive wavelength light beam 608 and temperature insensitive wavelength reflected light beam 618. Processing units 106 can be arranged to determine the distance 234 based on the measured intensities and the coefficient of absorption of the temperature insensitive wavelength light beam 608 and temperature insensitive wavelength reflected light beam 618. That is, as the coefficient of absorption does not substantially change based on the temperature of the liquid medium, the distance can be determined, using for example, the equations detailed above.

Continuing to block 710 "determine a temperature of an environment of the target based on the temperature sensitive light beam, a portion of the reflected light beam associated with the temperature sensitive light beam, and the distance" a temperature of the working environment 116 can be determined. For example, the temperature measurement subsystem 602 can receive a portion of the reflected beam 616 associated with the temperature sensitive wavelength light beam 606 (e.g., temperature sensitive wavelength reflected light beam 620) and can determine the temperature based on the temperature sensitive wavelength light beam 606, the temperature sensitive wavelength reflected light beam 620, and the distance 234. As a specific example, temperature measurement subsystem 602 can include optical detectors arranged to measure an intensity of the temperature sensitive wavelength light beam 606 and temperature sensitive wavelength reflected light beam 620. Processing units 106 can be arranged to determine the temperature based on the measured intensities and the distance 234 determined at block 708, using for example, the equations detailed above. With some examples, logic flow 700 can be iteratively repeated to determine the distance and the temperature in a "real-time" manner.

Figure 8:
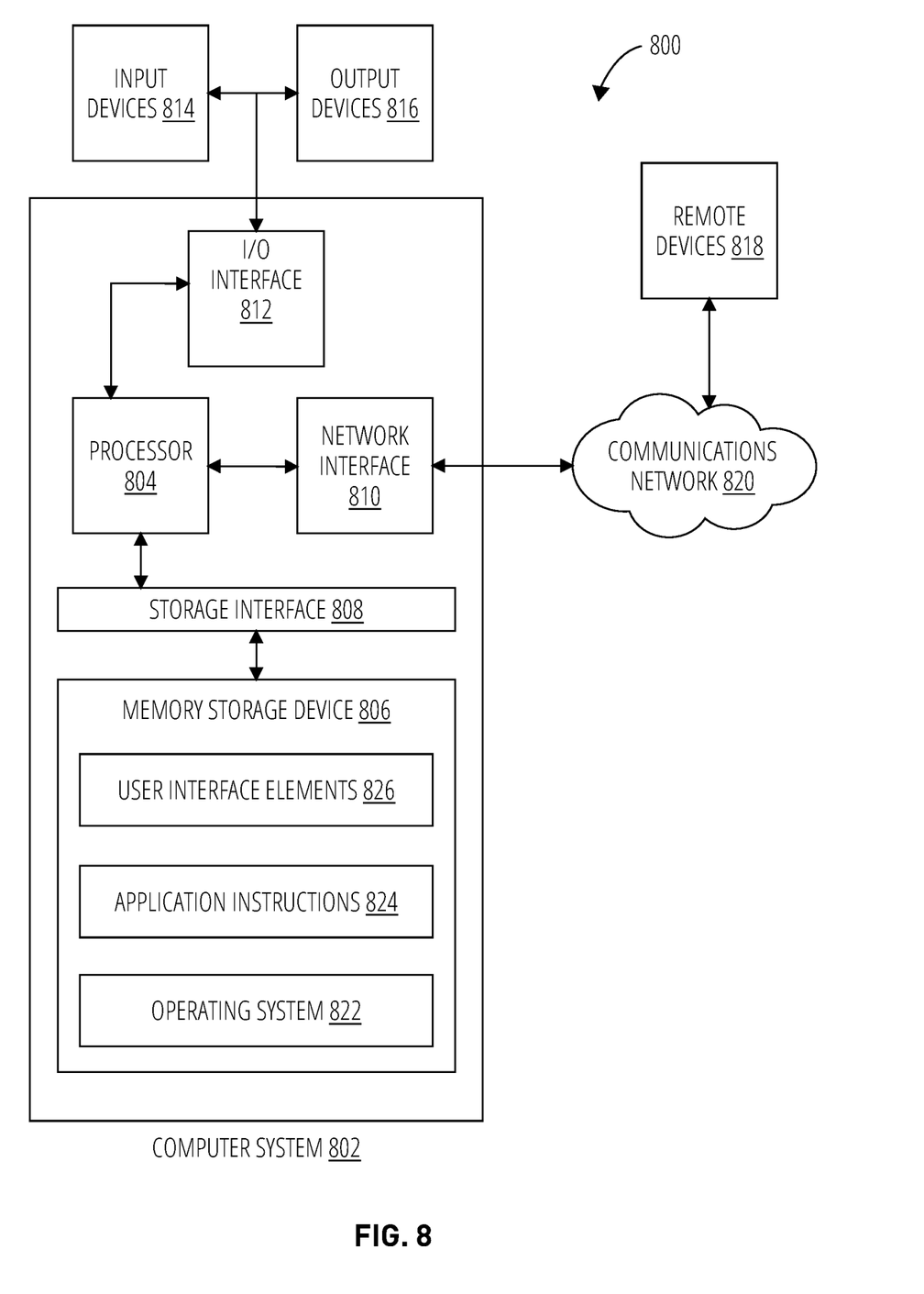
FIG. 8 illustrates a computing environment 800 in accordance with at least one embodiment of the disclosure.

FIG. 8 is a block diagram of a computing environment 800 including a computer system 802 for implementing embodiments consistent with the present disclosure. In some embodiments, the computing environment 800, or portion thereof (e.g., the computer system 802) may comprise or be comprised in a laser system (e.g., the system 100, the LETMS 200, the LETMS 500, the LETDMS 600 can embody portions of the computing environment 800). Accordingly, in various embodiments, computer system 802 may determine a temperature (or a distance and a temperature) and control a laser system based on the determined temperature as described herein.

The computer system 802 may include a central processing unit ("CPU" or "processor") 804. The processor 804 may include at least one data processor for executing instructions and/or program components for executing user or system-generated processes. A user may include a person, a person using a device such as those included in this disclosure, or another device (e.g., a physician, a nurse, a technician, or the like). The processor 804 may include specialized processing units such as integrated system (bus) controllers, memory management control units, floating point units, graphics processing units, neural processing units, digital signal processing units, etc. The processor 804 may be disposed in communication with input devices 814 and output devices 816 via I/O interface 812. The I/O interface 812 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMAX, or the like), etc.

Using the I/O interface 812, computer system 802 may communicate with input devices 814 and output devices 816. In some embodiments, the processor 804 may be disposed in communication with a communications network 820 via a network interface 810. In various embodiments, the communications network 820 may be utilized to communicate with a remote device 818 to access external storage or compute resources. The network interface 810 may communicate with the communications network 820. The network interface 810 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communications network 820 can be implemented as one of the different types of networks, such as intranet or Local Area Network (LAN), Closed Area Network (CAN) and such. The communications network 826 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communications network 820 may include a variety of network devices, including routers, bridges, servers, computing devices, storage devices, etcetera.

In some embodiments, the processor 804 may be disposed in communication with a memory storage device 806 via a storage interface 808. The storage interface 808 may connect to memory storage device 806 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etcetera.

Furthermore, memory storage device 806 may include one or more computer-readable storage media utilized in implementing embodiments consistent with the present disclosure. Generally, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The memory storage device 806 may store a collection of program or database components, including, without limitation, an operating system 822, an application instructions 824, and a user interface elements 826. In various embodiments, the operating system 822 may facilitate resource management and operation of the computer system 802. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACKBERRY® OS, or the like.

The application instructions 824 may include instructions that when executed by the processor 804 cause the processor 804 to perform one or more techniques, steps, procedures, and/or methods described herein, such as to determine a temperature of working environment 116 or a distance between distal end 112 and the target 102 (e.g., distance 234) and the temperature. For example, application instructions 824, when executed by processor 804 can cause processor 804 to perform the logic flow 400 and/or the logic flow 700.

The user interface elements 826 may facilitate display, execution, interaction, manipulation, or operation of program components through textual or graphical facilities. For example, user interfaces may provide computer interaction interface elements on a display system operatively connected to the computer system 802, such as cursors, icons, checkboxes, menus, scrollers, windows, widgets, etcetera. The user interface elements 826 may be employed by application instructions 824 and/or operating system 822 to provide, for example, a user interface with which a user can interact with computer system 802. In some embodiments, the user interface elements 826 may be integrated into or provided with a display.

With respect to the use of substantially any plural and/or singular terms herein, those having skill in the art can translate from the plural to the singular and/or from the singular to the plural as is appropriate to the context and/or application. The various singular and/or plural permutations are expressly set forth herein for sake of clarity and not limitation.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended. For example, as an aid to understanding, the detail description may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

All of the devices and/or methods disclosed and claimed herein can be made and executed without undue experimentation in light of the present disclosure. While the devices and methods of this disclosure have been described in terms of preferred embodiments, it may be apparent to those of skill in the art that variations can be applied to the devices and/or methods and in the steps or in the sequence of steps of the method described herein without departing from the concept, spirit, and scope of the disclosure. All such similar substitutes and modifications apparent to those skilled in the art are deemed to be within the spirit, scope and concept of the disclosure as defined by the appended claims.

What is claimed is:

1. An apparatus comprising:
   a light source, the light source arranged to generate a source light beam wherein a coefficient of absorption of the source light beam in a liquid medium is a function of a temperature of the liquid medium;
   a first detector arranged to measure an intensity of the source light beam;
   an optical component arranged to convey the source light beam to an optical fiber and to receive a reflected light beam responsive to the source light beam being directed at a target via the optical fiber;
   a second detector arranged to measure an intensity of the reflected light beam; and
   processing circuitry arranged to determine a temperature of a working environment based on the measured intensity of the source light beam, the measured intensity of the reflected light beam, and a distance between a distal end of the optical fiber and the target.

2. The apparatus of claim 1, comprising a beam splitter arranged to receive the source light beam and direct a first portion of the light beam to the first detector and a second portion of the light beam to the optical component.

3. The apparatus of claim 2, comprising:
a treatment light source arranged to generate a treatment light beam,
wherein the optical component comprises a beam combiner arranged to combine the treatment light beam and the second portion of the light beam.

4. The apparatus of claim 3, comprising at least one of a focusing lens, a blast shield, and a port arranged to optically convey the combined treatment light beam and the second portion of the light beam to the optical fiber.

5. The apparatus of claim 3, wherein the treatment light source is a holmium gas laser or a thulium fiber laser.

6. The apparatus of claim 2, wherein the beam splitter is arranged to direct the reflected light beam to the second detector.

7. The apparatus of claim 1, the light source being a first light source and the light beam being a first light beam, the apparatus comprising:
a second light source, the second light source arranged to generate a second light beam wherein a coefficient of absorption of the second light beam in the liquid medium is a function of the temperature of the liquid medium, and wherein a wavelength of the first light beam and a wavelength of the second light beam are different; and
an optical multiplexor arranged to combine the first light beam and the second light beam.

8. The apparatus of claim 1, the processing circuitry comprising a processing unit and a memory device storing instructions that when executed by the processing unit cause the processing unit to:
determine an absorption coefficient value based on the measured intensity of the source light beam, the measured intensity of the reflected light beam, and the distance; and
determine the temperature based on the absorption coefficient value.

9. The apparatus of claim 8, wherein the instructions, when executed by the processing unit cause the processing unit to determine the absorption coefficient value based on the formula: $I=I_0 e^{2\lambda D}$, where D is the distance, $\lambda$ is the absorption coefficient, $I_0$ is the measured intensity of the source light beam, I is the measured intensity of the reflected light beam, and e is Euler's number.

10. The apparatus of claim 1, wherein the distal end of the optical fiber and the target are disposed in the working environment.

11. A method comprising:
generating a light beam wherein a coefficient of absorption of the light beam in a liquid medium is a function of a temperature of the liquid medium;
measuring an intensity of the light beam;
conveying the light beam to an optical fiber;
receive a reflected light beam responsive to the light beam being directed at a target via the optical fiber;
measuring an intensity of the reflected light beam; and
determining a temperature of a working environment based on the measured intensity of the light beam, the measured intensity of the reflected light beam, and a distance between a distal end of the optical fiber and the target.

12. The method of claim 11, comprising:
splitting, at a beam splitter, the light beam into a first portion and a second portion;
directing, via the beam splitter, the first portion of the light beam to a reference detector; and
directing, via the beam splitter, the second portion of the light beam to an optical component, the optical component arranged to convey the light beam to the optical fiber.

13. The method of claim 12, comprising:
generating a treatment light beam; and
combining the treatment light beam and the second portion of the light beam.

14. The method of claim 13, wherein the optical component comprises at least one of a focusing lens, a blast shield, and a port.

15. The method of claim 13, wherein the treatment light beam is generated via a holmium gas laser or a thulium fiber laser.

16. The method of claim 12, directing, via the beam splitter, the reflected light beam to a reflection detector.

17. The method of claim 11, the light beam being a first light beam, the method comprising:
generating a second light beam wherein a coefficient of absorption of the second light beam in the liquid medium is a function of the temperature of the liquid medium, and wherein a wavelength of the first light beam and a wavelength of the second light beam are different; and
combining the first light beam and the second light beam.

18. The method of claim 11, comprising:
determining an absorption coefficient value based on the measured intensity of the light beam, the measured intensity of the reflected light beam, and the distance; and
determining the temperature based on the absorption coefficient value.

19. The method of claim 18, comprising determining the absorption coefficient value based on the formula: $I=I_0 e^{2\lambda D}$, where D is the distance, $\lambda$ is the absorption coefficient, $I_0$ is the measured intensity of the light beam, I is the measured intensity of the reflected light beam, and e is Euler's number.

20. The method of claim 11, wherein the distal end of the optical fiber and the target are disposed in the working environment.

* * * * *